United States Patent [19]

Uehara et al.

[11] Patent Number: 4,886,149

[45] Date of Patent: Dec. 12, 1989

[54] ROTARY TYPE HYDRAULIC DAMPER

[75] Inventors: Kenji Uehara; Shinji Takayanagi, both of Tokyo; Ikuo Oike, Saitama, all of Japan

[73] Assignee: Honda Giken Kogyo Kabushiki Kaisha, Tokyo, Japan

[21] Appl. No.: 128,142

[22] Filed: Dec. 3, 1987

[30] Foreign Application Priority Data

Dec. 3, 1986 [JP] Japan ................... 61-288507
Dec. 3, 1986 [JP] Japan ................... 61-288511

[51] Int. Cl.$^4$ ................................. F16F 9/14
[52] U.S. Cl. .......................... 188/306; 16/58; 60/369; 180/219; 280/284
[58] Field of Search ............... 188/306, 308, 307, 309, 188/310; 16/58; 280/284, 285; 180/219, 231; 60/369

[56] References Cited

U.S. PATENT DOCUMENTS

| 2,038,596 | 4/1936 | Peo | 188/310 X |
| 2,043,488 | 6/1936 | Peo | 188/309 |
| 2,419,651 | 4/1947 | Magrum | 188/310 |
| 4,716,996 | 1/1988 | Hummel | 188/306 |

FOREIGN PATENT DOCUMENTS

| 2327338 | 12/1974 | Fed. Rep. of Germany | 188/306 |
| 1013345 | 4/1952 | France | 188/306 |
| 90712 | 7/1981 | Japan | 188/306 |
| 86/03267 | 6/1986 | World Int. Prop. O. | 180/219 |

Primary Examiner—George E. A. Halvosa
Attorney, Agent, or Firm—Lyon & Lyon

[57] ABSTRACT

A rotary type hydraulic damper for motorcycle suspension application is disclosed in which a shaft and a housing each containing oppositely extending vanes are arranged for relative rotational movement. The vanes cooperate to define alternately spaced expansion and compression chambers between which hydraulic fluid is passed in response to relative movement between the shaft and the housing. According to one aspect of the invention, a manifold arrangement includes the interconnection of the expansion chambers at one end of the housing and that of the compression chambers at the other end thereof, and a throttling device restricts the flow of fluid between the respective chambers to provide a damping force generator. According to another aspect of the invention the damper shaft provides structural support for the motorcycle drive sprocket, whereby strength requirements for the sprocket bearing case are reduced.

8 Claims, 3 Drawing Sheets

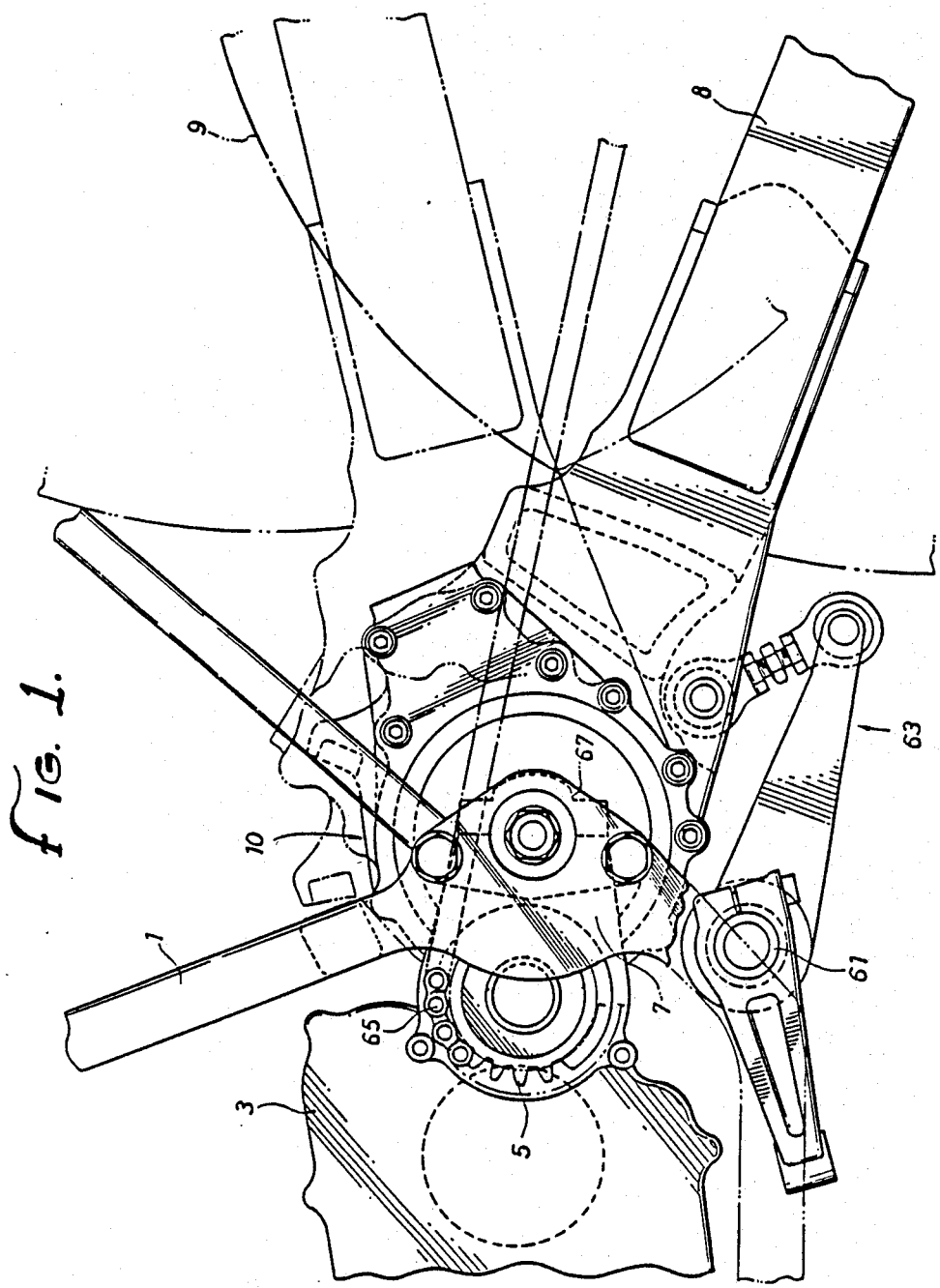

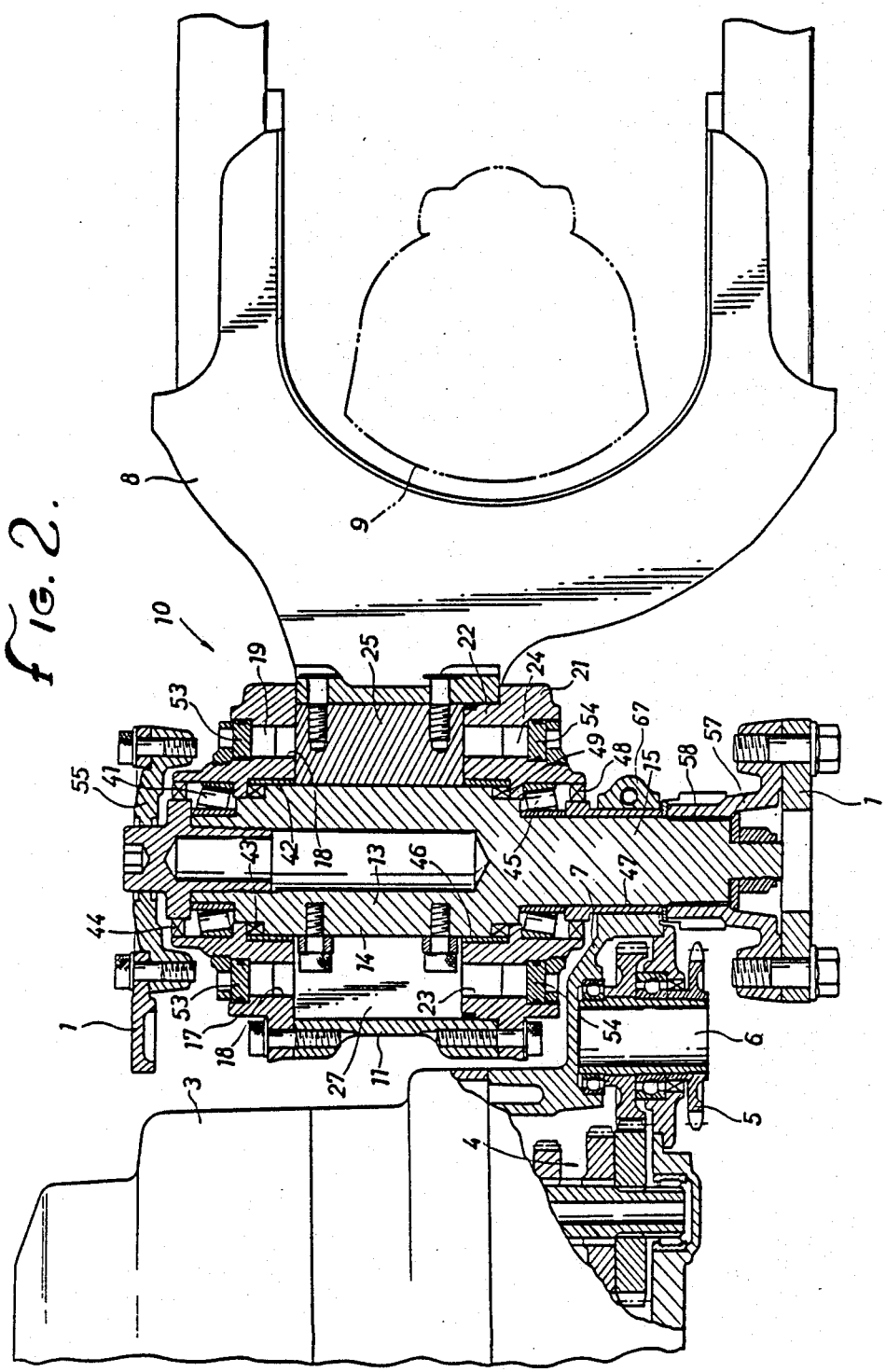

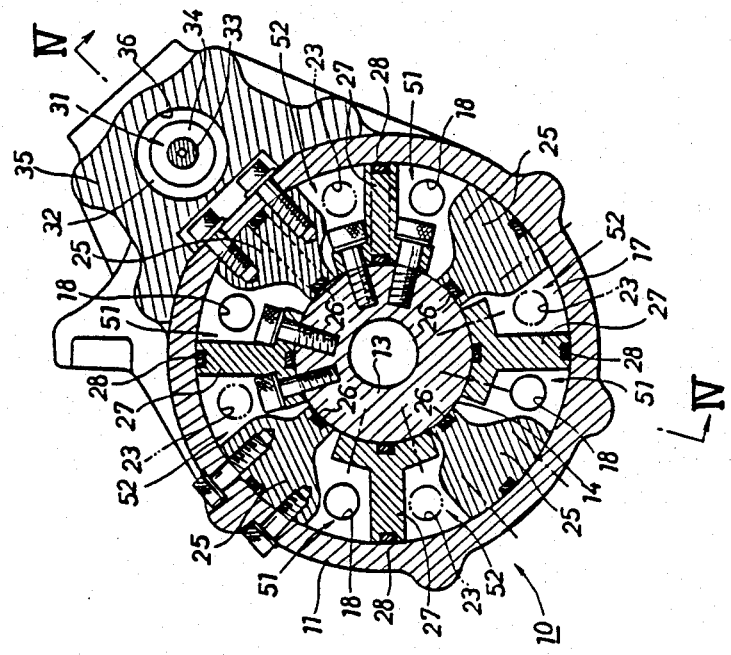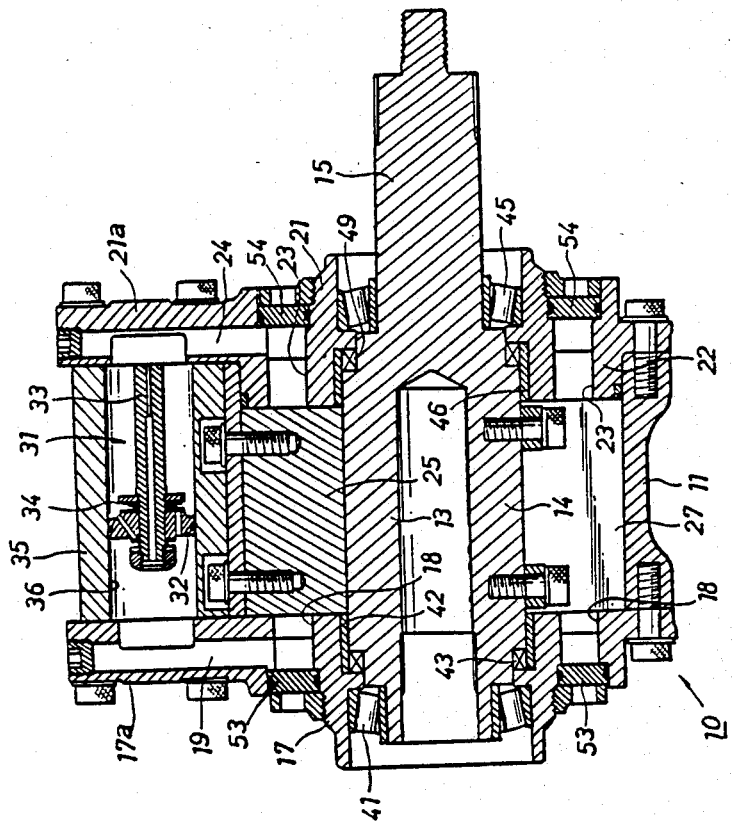

ROTARY TYPE HYDRAULIC DAMPER

BACKGROUND OF THE INVENTION

The present invention relates to a rotary type hydraulic damper. More particularly, the invention relates to a rotary type hydraulic damper especially adapted for use with a motorcycle suspension.

As one kind of hydraulic damper used for the rear wheel suspension of a motorcycle there is, for example, a rotary type hydraulic damper as disclosed in Japanese Laid-Open Patent Publication No. 56-28008 (No. 28008/1981). Generally, this kind of rotary type hydraulic damper comprises a shaft arranged in a cylindrical housing which is closed at both ends by fixedly providing side cases rotatable with respect to said shaft, and a plurality of oil chambers which are defined in said housing by projecting vanes diametrically oppositely from an inner periphery of the cylindrical housing and from an outer periphery of the shaft, which vanes communicate with each other through the intermediary of damping force generating means.

Also, there is disclosed in a Japanese Patent Application , assigned to the assignee herein, a rotary type damper particularly adapted for motorcycle suspension applications. The described damper apparatus is one wherein one of the end cases is provided with a pair of oil passages that connect the damping force generating means of the apparatus on the one hand with compression side oil chambers and on the other hand with expansion side oil chambers. Obviously, in situations such as in the disclosed arrangement where both of the oil passages are provided in one end case, the problem arises that each of the passages must be limited in its cross-sectional flow area. Consequently, the resistance to flow of hydraulic fluid through the passages is increased and, as a result, the design of the damping force generator is more complicated.

Moreover, in the apparatus disclosed in Japanese Patent Application No. 60-265936, the shaft of the rotary type damper is coaxially arranged with the swing shaft of the swing arm that is pivotally mounted with respect to the vehicle frame and the drive sprocket, that drives the vehicle wheel supported on the swing arm, is mounted on a bearing case provided on the engine. Consequently, because the loading of the driving chain is concentrated on the sprocket, the bearing case provided on the rear of the engine must have sufficient mass to withstand this loading. This results in a bearing case that is thick and heavy.

It is to the amelioration of these problems, therefore, that the present invention is directed.

SUMMARY OF THE INVENTION

According to one aspect of the present invention, therefore, there is provided a rotary-type hydraulic damper in which the flow area of the respective flow passages is made sufficiently large so as to reduce the resistance to flow of the hydraulic fluid such that only the damping force generating means need be considered in setting the damping characteristics of the apparatus.

In order to attain the aforesaid object, the present invention provides a rotary type hydraulic damper characterized in that one of the end cases is provided with an oil passage which communicates the damping force generating means with oil chambers of the compressing side, and that the other end case is provided with an oil passage which communicates the damping force generating means with oil chambers of the expanding side.

Since each of the oil passages is provided respectively in separate end cases, it is possible to make the sectional areas of the respective oil passages large, thereby to be capable of reducing the resistance to flow of the hydraulic fluid in the oil passages. Accordingly, the damping characteristic can be freely set only by design of the damping force generating means.

According to another aspect of the invention, it is an object to provide a vehicle with a rotary type hydraulic damper which is adapted to withstand the loading for driving the chain by utilizing the damper shaft thereby allowing the bearing case mounting the drive sprocket to be thin and, accordingly, small and light in weight.

In order to attain this object, the present invention provides a vehicle in which the shaft of the rotary type hydraulic damper is arranged coaxially with the swing shaft of the swing arm which is pivotably mounted on the rear of the engine with respect to a vehicle body. The drive sprocket for driving the rear wheel supported on the swing arm is arranged on the rear of the engine, in a bearing case that is supported, at least in part, by the shaft of the rotary type hydraulic damper.

Since the bearing case arranged on the rear of the engine is supported by the shaft, loading on the drive sprocket resulting from driving the chain is accommodated by the shaft through the intermediary of the bearing case. Accordingly, the bearing case need not contain the structural mass heretofore required for supporting the drive sprocket and can, therefore, be made smaller and thinner.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 1 is a partial enlarged side view of a motorcycle suspension according to the present invention;

FIG. 2 is a partial enlarged plan view, partly in section of the motorcycle suspension of FIG. 1;

FIG. 3 is an elevational section of the rotary type hydraulic damper incorporated in the motorcycle suspension of FIG. 1; and FIG. 4 is a sectional view taken along line IV—IV of FIG. 3.

DETAILED DESCRIPTION OF A PREFERRED EMBODIMENT

FIGS. 1 and 2 show a side view and a plan view in partial section, respectively, of essential parts of a motorcycle. Reference numerals indicate a vehicle body frame at 1, a transmission case integral with an engine at 3, a swing arm at 8, a rear wheel at 9, and a rotary type hydraulic damper at 10.

The rotary type damper 10, also as shown in FIGS. 3 and 4, comprises a circular cylindrical housing 11, a shaft 13, end cases 17, 21, vanes 25, 27 and damping force generating means 31, or the like. The damping force generating means 31 is provided with a piston 32, an orifice member 33 and a piston valve 34. In an inner periphery of the cylindrical housing 11 are provided four vanes 25 that project radially and are secured by bolts on a substantially equal circumferential spacing. Also, projecting from the outer periphery of the large dimeter portion 14 of the shaft 13 are four vanes 27. Both of the vanes 25, 27 have the same rectangular shape. When the shaft 13 is coaxially inserted into the cylindrical housing 11, the vane 25 of the cylindrical housing 11 is adapted to slidably contact the outer peripheral surface of the large diameter portion 14 of the shaft 13. The vane 27 of the shaft 13 at this time slidably contacts the inner peripheral surface of the cylindrical housing 11. Seal members 26, 28 are fitted into the respective lateral grooves formed in the slidably contacting surfaces of the vanes 25, 27.

On one axial end of the shaft 13 is rotatably mounted one end case 17 through the intermediary of a bearing 41. This end case 17 is flat in its inner side surface and is fixed by bolts on an end surface of the cylindrical housing 11 in close proximity to the end of the cylindrical housing and to both vanes 25, 27. A sleeve 42 is interposed between the outer periphery of the axial end of the large diameter portion 14 of the shaft 13 and the end case 17. Seal rings 43, 44 are interposed between the shaft 13 and the end case 17 on opposite sides of the bearing 41.

At the other end of the shaft 13 is formed a reduced diameter shaft extension portion 15. At the large diameter portion 14 end of the shaft extension portion 15 is rotatably mounted the other end case 21 through the intermediary of a bearing 45. On the inner side surface of the end case 21 is formed a circular projecting portion 22 which is press fit into the inner surface of the other end of the cylindrical housing 11. The end surface of the projecting portion 22 is flat and is placed in a condition close to the other end surface of the vanes 25, 27 whereby the end case is fixed by bolts on the end surface of the cylindrical housing 11. The sleeve 46, similar to the sleeve 42 mentioned previously, is interposed between the large diameter portion 14 of the shaft 13 and the end case 21. Further, into an intermediate portion of the shaft extension portion 15 is fitted a collar 47, between which and the end case 21 is interposed a seal ring 48. Also, a seal ring 49 is interposed between the shaft 13 and the end case 21 on the side opposite the bearing 45.

Then, in a space surrounded and closed by the cylindrical housing 11, the shaft 13 and both end cases 17, 21, four compressing side oil chambers 51 and four expanding side oil chambers 52 on alternate spacing in the peripheral direction are defined by the vanes 25, 27.

Further, on the inner side surface of the one end case 17 are formed oil bores 18 opening to the compressing side oil chambers 51. Each of the oil bores 18 communicates via an annular oil passage 19 formed in the end case 17. Also, on the end surface of the projecting portion 22 of the other end case 21 are formed oil bores 23 opening to the expanding side oil chamber 52 and communicating via an oil passage formed similarly in the end case 21. The opposite ends of the oil bores 18, 23 are closed by plugs 53, 54. At a portion of the outer periphery of the cylindrical housing 11 is provided a valve case 35 in which a circular valve chamber 36 is formed laterally to penetrate therethrough and to contain the damping force generating means 31. In the valve chamber 36 is slidably fitted the piston 32 including the concentrically formed orifice member and the piston valve 34. The valve case 35 is fixed by bolts that extend between extension portions 17a, 21a formed on the end cases 17, 21, with the oil passages 19, 24 opening to the respective ends of the valve chamber 36.

Thus, the rotary type hydraulic damper 10 is assembled and filled with a hydraulic fluid. The rotary type hydraulic damper 10 is so constructed that the cylindrical housing 11 is integrally attached to the front end portion of the swing arm 8, and the shaft 13 is fixed to the vehicle body frame 1. Further, the rear wheel is borne on the rear end portion of the swing arm 8.

One holder 55 is rotatably assembled on the one end of the large diameter portion 14 side of the shaft 13. Also, the other holder 57 is assembled via splines 58 to a leading end of the shaft extension portion 15 of the shaft 13 and is fixed thereto by a nut. Each of the holders 55 and 57 are fixed by bolts to the inner surface of the left and right vehicle body frames. By means of this, the structure of the rotary type hydraulic damper 10 is such that the shaft 13 is stationary and the cylindrical housing 11 that is integral with the swing arm 8 constitutes the rotary member, whereby the swing arm 8 is capable of swinging up and down about the shaft 13.

When the swing arm 8 swings upwardly as shown by the phantom line in FIG. 1, hydraulic fluid passes from the compressing side oil chamber 51 through the oil passage 19 and is throttled through the orifice member 33 and the piston valve 34 in the valve chamber 36. As a result, the hydraulic fluid flows into the expanding side oil chambers 52 through the oil passage 24 while generating a damping force.

Further, between the swing arm 8 and the vehicle body frame 1 are suspended a torsion bar 61 and a link mechanism 63. The swing arm 8 is adapted to return to the position shown by full lines in FIG. 1 under the influence of the spring force of the torsion bar 61.

In the aforesaid structure, the transmission case 3 is arranged in close proximity to the front of the hydraulic damper 10. The drive sprocket from which power from the transmission gear mechanism 4 is output is arranged in front of the spline portion 58 of the holder 57 assembled on the shaft extension portion 15 of the shaft 13. The bearing case 7 mounting the sprocket shaft 6 laterally of the holder 57 is fixed to the outer periphery of the collar 47 on the shaft extension portion 15 by means of bearing holder 67 provided by splitting the rear end of the bearing case 7, applying it to the collar 47, and securing the split portions by bolts.

Since the compressing side oil passages 19 and the expanding side oil passages 24 are provided separately in the respective end cases 17 and 21, the sectional area of each of the oil passages 19 and 24 can be large since they do not interfere with each other.

Moreover, the cylindrical housing 11 is adapted for location on one side with respect to the shaft 13 and to arrange the drive sprocket 5 on the other side thereof. Accordingly, it is possible to support on the shaft 13 the bearing case 7 which is provided integrally on the rear of the transmission case 3 so as to supportingly bear the sprocket shaft 6, whereby the loading imposed as a result of driving the chain 65 is accommodated by the shaft 13 through the intermediary of the bearing case 7. Thus, since the bearing case 7 is reinforced by the shaft 13, it is unnecessary that it be constructed of a size and mass to alone support the drive sprocket 5. Instead, it may be small and light in its dimension and weight.

Even though the description herein was made in a connection with a rear wheel suspension of a motorcycle it should be understood that the invention is not so limited and that the described rotary type hydraulic damper can be applied to, for example, a trailing arm suspension of a general vehicle. Alternatively, of course, it is possible to fix the cylindrical housing and to use the shaft as the rotary side.

It should be further understood that, although a preferred embodiment of the invention has been illustrated and described herein, changes and modifications can otherwise be made in the described arrangement without departing from the scope of the appended claims.

We claim:

1. A rotary-type hydraulic damper apparatus, comprising:

a housing; end cases closing the lateral ends of said housing;

one of said end cases containing fluid passage means defining the low pressure fluid passage of said apparatus and the other of said end cases containing fluid passage means defining the high pressure fluid passage of said apparatus;

a shaft enclosed within said housing and adapted for relative rotational movement therewith;

a plurality of vanes extending oppositely from said housing and said shaft defining alternately positioned fluid chambers, including expansion chambers and compression chambers about the interior of said housing; and means for passing hydraulic fluid between said expansion chambers and said compression chambers in response to relative rotational movement between said shaft and said housing including means forming substantially unrestricted openings from one lateral end of said housing for communicating each of said expansion chambers with said low pressure passage in said one end case and means forming substantially unrestricted openings in the other lateral end of said housing for communicating each of said compression chambers with said high pressure fluid passage in said other end case.

2. The apparatus according to claim 1 wherein said hydraulic fluid passing means includes means outside said housing for connecting said low pressure passage and said high pressure passage and damping means for throttling the flow of hydraulic fluid between said passages.

3. The apparatus according to claim 2 wherein said throttling means includes manifold means interposed in the fluid flow sense between said low pressure passage and said high pressure passage; and means forming a flow orifice in said manifold means for throttling the flow of fluid between said passages.

4. A rotary type hydraulic damper apparatus, comprising:

a cylindrical housing;

oppositely spaced end cases closing the axial ends of said housing, one of said end cases containing fluid passage means defining the low pressure fluid passage of said apparatus and the other of said end cases containing fluid passage means defining the high pressure fluid passage of said apparatus;

a shaft enclosed within said housing journalled in said end cases for relative rotational movement with respect to said housing;

a plurality of vanes extending oppositely from said housing and said shaft defining alternately disposed expansion and compression chambers in said housing;

means for creating relative rotational movement between said shaft and said housing; and substantially unrestricted openings in said one end case for passing hydraulic fluid between all of said expansion chambers and said low pressure passage and substantially unrestricted openings in said other end case for passing hydraulic fluid between all of said compression chambers and said high pressure passage in response to the relative movement between said shaft and said housing.

5. The apparatus according to claim 4, wherein said hydraulic fluid passing means includes a valve chamber outside said housing interconnecting said high pressure passage and said low pressure passage and means in said valve chamber for throttling the flow of hydraulic fluid between said passages.

6. The apparatus according to claim 5 wherein said throttling means includes a valve member in said valve chamber; and means forming a flow orifice in said valve member for throttling the flow of fluid between said passages.

7. The apparatus according to claim 4 particularly adapted for damping a motorcycle suspension including a frame and a swing arm mounting a wheel and wherein said swing arm is connected to one, and said frame is connected to the other, of said housing and said shaft.

8. The apparatus according to claim 7 including a rotatable drive sprocket for imparting driving movement to said wheel, and means supportedly attached to said shaft for journalling said drive sprocket.

* * * * *

UNITED STATES PATENT AND TRADEMARK OFFICE
CERTIFICATE OF CORRECTION

PATENT NO. : 4,886,149
DATED : December 12, 1989
INVENTOR(S) : UEHARA et al.

It is certified that error appears in the above-identified patent and that said Letters Patent is hereby corrected as shown below:

In claim 4 (column 6, line 15) before "vanes" insert -- radial --.

Signed and Sealed this

Nineteenth Day of February, 1991

Attest:

HARRY F. MANBECK, JR.

Attesting Officer

Commissioner of Patents and Trademarks